United States Patent
Silknitter

(10) Patent No.: US 9,144,302 B1
(45) Date of Patent: Sep. 29, 2015

(54) TRAY SYSTEM AND METHOD

(71) Applicant: Scott P. Silknitter, Greensboro, NC (US)

(72) Inventor: Scott P. Silknitter, Greensboro, NC (US)

(*) Notice: Subject to any disclaimer, the term of this patent is extended or adjusted under 35 U.S.C. 154(b) by 0 days.

(21) Appl. No.: 14/518,836

(22) Filed: Oct. 20, 2014

Related U.S. Application Data

(63) Continuation of application No. 13/081,698, filed on Apr. 7, 2011, now Pat. No. 8,863,672.

(51) Int. Cl.
*A47B 23/00* (2006.01)
*A47B 23/06* (2006.01)
*G09B 19/04* (2006.01)

(52) U.S. Cl.
CPC .............. *A47B 23/002* (2013.01); *A47B 23/06* (2013.01); *G09B 19/04* (2013.01)

(58) Field of Classification Search
CPC ... A47B 23/002; A47B 23/06; A47G 23/0608
USPC ......... 108/38, 43, 33; 206/579; 273/271, 309, 273/287, 284
See application file for complete search history.

(56) References Cited

U.S. PATENT DOCUMENTS

| | | | | |
|---|---|---|---|---|
| 3,633,913 A | * | 1/1972 | Solimene | 273/248 |
| 3,777,410 A | * | 12/1973 | Robinson | 434/323 |
| 3,795,989 A | * | 3/1974 | Greenberg et al. | 434/339 |
| 3,802,102 A | * | 4/1974 | Licciardi | 40/564 |
| 4,228,596 A | * | 10/1980 | Daniel | 434/344 |
| 4,575,094 A | * | 3/1986 | Ferris et al. | 273/249 |
| 4,788,916 A | * | 12/1988 | Saxton | 108/43 |
| 5,388,547 A | * | 2/1995 | Lehr et al. | 116/222 |
| 5,460,102 A | * | 10/1995 | Pasmanick | 108/43 |
| 5,937,765 A | * | 8/1999 | Stirling | 108/43 |
| 6,041,715 A | * | 3/2000 | Jarke et al. | 108/43 |
| 6,082,545 A | * | 7/2000 | Ford et al. | 206/579 |
| 6,991,232 B1 | * | 1/2006 | Yufa | 273/239 |
| 7,150,236 B1 | * | 12/2006 | Riley | 108/43 |
| D630,452 S | * | 1/2011 | Robbins et al. | D6/406.3 |
| 2001/0017444 A1 | * | 8/2001 | Guillen | 273/441 |
| 2004/0201171 A1 | * | 10/2004 | O'Neill | 273/260 |
| 2008/0012220 A1 | * | 1/2008 | O'Neill | 273/236 |
| 2009/0265897 A1 | * | 10/2009 | Haynes | 24/303 |

FOREIGN PATENT DOCUMENTS

FR  2604073 A1 * 3/1988 ............... A63F 3/02

* cited by examiner

*Primary Examiner* — Hanh V Tran
(74) *Attorney, Agent, or Firm* — Blake P. Hurt; Tuggle Dugins P.A.

(57) ABSTRACT

A modular activity tray system is provided for elderly, infirmed and other users whereby a variety of tops can be interchangeably positioned in the tray for entertainment, crafts, hobby work, eating or other uses. The tray system and method provides advantages over conventional devices as a cushion, tray and top combine in easy to assemble manner. The tray system features a variety of tops which can be removed and exchanged for other tops to allow the user to practice various manual skills. A cushioned base can be releasably fastened to the tray for use in the lap or removed for use of the tray system on a table or the like. Playing games, writing letters of the alphabet, completing jigsaw puzzles and other activities can be selected to allow each user to practice various physical and mental skills.

14 Claims, 9 Drawing Sheets

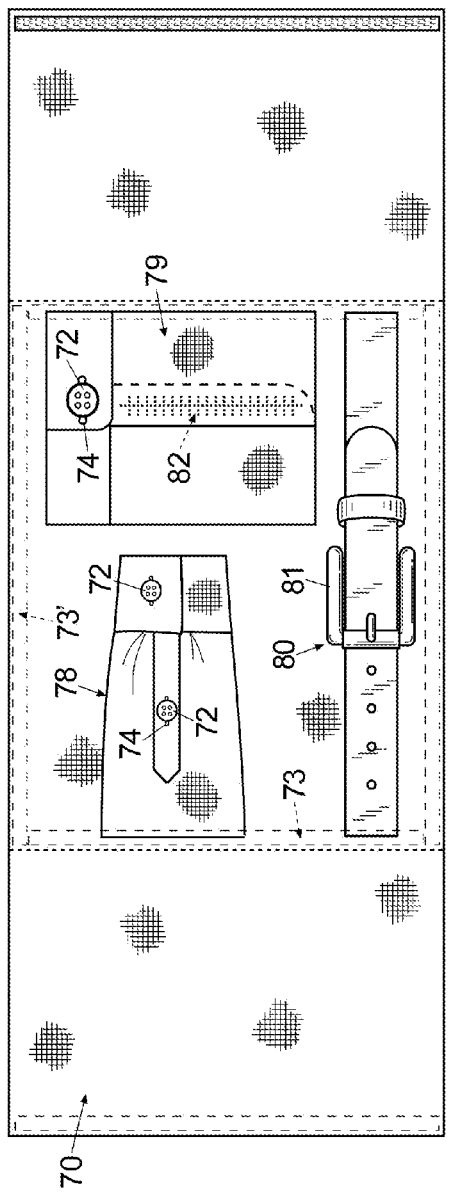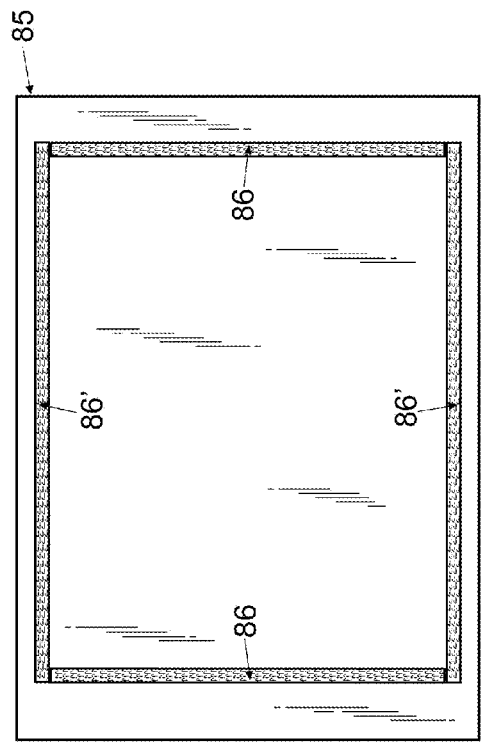

TRAY SYSTEM AND METHOD

This is a continuation of and claims benefits under prior application Ser. No. 13/081,698 filed 7 Apr. 2011, now U.S. Pat. No. 8,863,672, which is incorporated by reference in its entirety herein.

FIELD OF THE INVENTION

The invention herein pertains to a tray system and particular pertains to a modular activity tray system which includes a personal tray and a variety of slideable interchangeable tops which can be used in a home or group setting by incapacitated or elderly patients, game board players and others for playing a variety of games, practicing life skills and maintaining various items in a convenient, accessible manner. The tray can be placed on the lap or used on a counter or table top. A cushion with side flaps is provided for releasable attachment to the tray when used on the lap for comfort and to maintain the tray on the lap.

DESCRIPTION OF THE PRIOR ART AND OBJECTIVES OF THE INVENTION

In my earlier filed patent application Ser. No. 12/898,764 filed 6 Oct. 2010, entitled: TRAY SYSTEM AND METHOD, now U.S. Pat. No. 8,635,959 issued 28 Jan. 2014 which is incorporated by reference in its entirety herein, a tray system was disclosed having various tops which enable users to play different games, practice life skills and other activities, with removable tops. Improvements are displayed in the present invention to maintain stability of the tray system in use to assist the elderly and those with relatively little manual dexterity in playing games, practicing life skills, completing jigsaw puzzles, writing the alphabet, numbers and otherwise.

Thus in accordance with the improvements made over older tray systems the present invention was conceived and one of its objectives is to provide a tray system which includes a tray, a variety of interchangeable tops and a cushion which is easily attached or removed from the bottom of the tray for ease, stability and comfort while on the user's lap.

It is another objective of the present invention to provide a top which is slideably mounted through an open end of the tray into channeled side walls and abuts an opposing end wall of the tray to hold the top in a stable posture.

It is still another objective of the present invention to provide a tray system having a plurality of slideable interchangeable tops which can be easily removed or exchanged for playing different games, crafts, learning exercises and life skills.

It is yet another objective of the present invention to provide a top which includes in one embodiment, shirt components and in another embodiment pant components, each on a fabric backing and including various garment fasteners such as buttons, snaps, zippers and the like for manual manipulation practice.

It is a further objective of the present invention to provide a top with a dry erase coating which includes the alphabet for use in practicing forming the letters thereon.

It is still a further objective of the present invention to provide an unmarked planar top which slidably engages the tray for use as a jigsaw puzzle holder while another embodiment includes a transparent retaining strap for holding a sketch pad, writing tablet or the like.

It is yet a further objective of the present invention to provide a tray system formed generally from a high density polyethylene for durability and cleaning purposes.

It is also another objective of the present invention to provide a tray system for fun and entertainment which will allow the mind and hands of the user to exercise while improving quality of life.

It is still also a further objective of the present invention to provide a tray system which is lightweight yet stable while in use for various crafts, games, puzzles, therapy, dining and the like.

Various other objectives and advantages of the present invention will become apparent to those skilled in the art as a more detailed description is set forth below.

SUMMARY OF THE INVENTION

The aforesaid and other objectives are realized by providing a modular activity tray system which includes a rectangular tray having an open end at one end of the longitudinal axis for easily inserting and removing various interchangeable tops. Internal opposing channels placed along the inside of the tray sides allow the tops to slideably engage the tray so the top will remain steady when the tray system is in use. The tops can be any of a selected variety such as may be used for board games having recesses therein for receiving pegs, planar surfaces for completing jigsaw puzzles, writing or any of a variety of other activities such as drawing, working with modeling clay or the like for enjoyment, learning and improvement of dexterity skills. The tops may also consist of surfaces having printed areas thereon such as for practicing writing the alphabet, numbers and the like by utilizing a dry erase coating or otherwise for easy cleaning and repeatable usage. Other accessories of the tray system may include dry erase markers, dry erase crayons, pens, putty or pegs for various peg insertion along specific configured tops such as for tic-tac-toe, peg solitaire, peg eight man game, peg knight and other peg board games. A sorter top having separate depressions therein for sorting and separating change, buttons or the like is also included.

The tray includes a removable cushion for attachment to the bottom to comfortably contain the tray on a user's lap. The cushion includes two side flaps which include loop fastener sections to engage complementary hook fastener sections positioned on each end of the tray for easy attachment or detachment such as when the tray is placed on a table or counter top. The rectangular tray provides a storage compartment separated by a divider to divide the space into two internal compartments.

Certain tops utilize garment parts attached to a fabric backing which can be joined to a planar top which allow the user to practice buttoning and unbuttoning shirts, snapping and unsnapping, zipping and unzipping pants, connecting belt buckles and for practice of other common activities.

In the method of use one of the variety of interchangeable tops is selected and inserted within the tray side channels for individual or group use by elderly, infirmed and other persons. Due to its light weight and multi-functional top features one can enjoy many activities such as working on a puzzle or craft, playing a game such as tic-tac-toe or practicing dexterity to exercise the senses. If utilized in the user's lap the cushion is selected and attached to the bottom of the tray by manually affixing the loop fastener sections on the cushion side flaps to the corresponding hook fastener sections on the ends of the tray. Once an activity is completed, the top can be grasped and slid from the tray and another top selected for insertion into the tray channels for other activities.

BRIEF DESCRIPTION OF THE DRAWINGS

FIG. 8 shows a top plan view of a top having a transparent strap thereon for holding a writing pad, sketch pad, tablet or the like;

FIG. 17 features a top plan view of certain other garment components attached to a fabric layer; and FIG. 18 pictures a top with hook fastener sections affixed thereto for receiving and mating with the loop fastener sections on the bottom of the fabric layers of FIG. 15 or FIG. 17.

DETAILED DESCRIPTION OF THE PREFERRED EMBODIMENT AND OPERATION OF THE INVENTION

Figure 1:
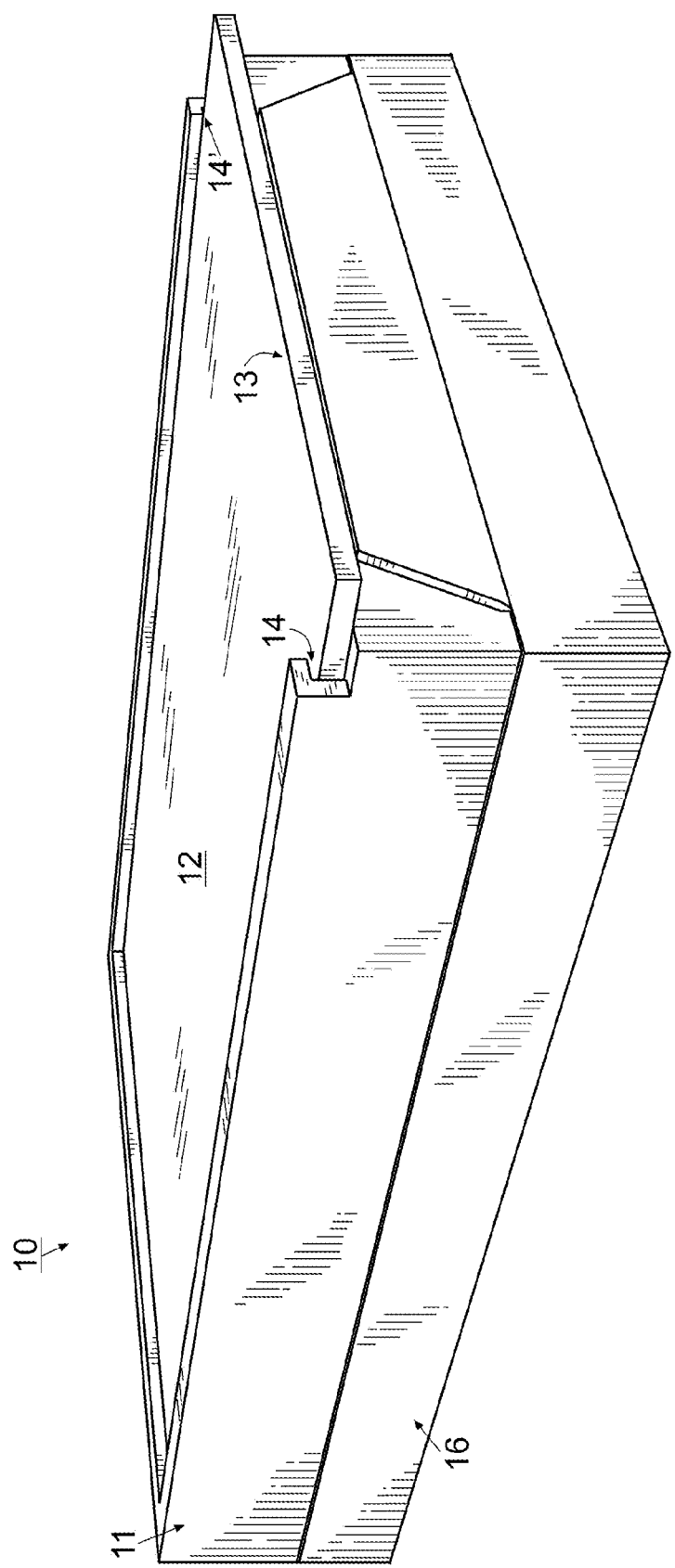
FIG. 1 shows a top, front, right end perspective view of the tray system having a top positioned in a tray and a bottom cushion affixed thereto, the bottom of the tray system being plain and un-ornamental.
Figure 7:
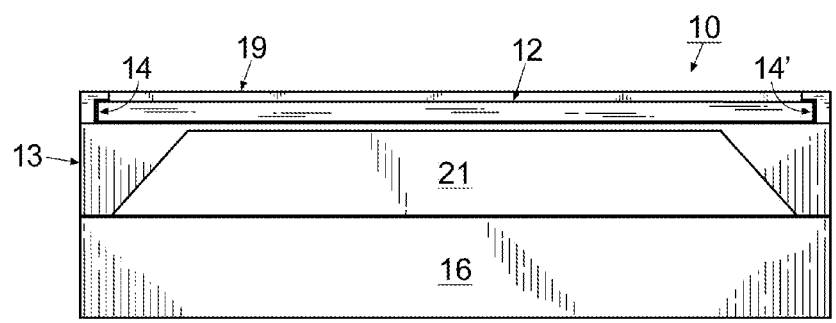
FIG. 7 depicts a right end view of the tray system as shown in FIG. 1.

For a better understanding of the invention and its operation, turning now to the drawings, preferred tray system 10 is shown in FIG. 1 having rectangular tray 11, with planar top 12 positioned therein and cushion 16 affixed to the bottom thereof. Rectangular tray 11 is formed from 100% virgin polymer, marine-grade cellular material which prevents rotting, swelling, splintering or delaminating when exposed to humidity or water and which is durable, easy to clean and requires no refinishing. Tray 11 can be treated with a suitable color coating as desired. Tray 11 is cut from standard 4'×8' sheets or molded by conventional molding techniques and includes open end 13, opposing closed end 19 and sides 15, 15' having respectively channels 14, 14' along the inside thereof. Channels 14, 14' as also seen in FIG. 7 allow planar top 12 to easily slide within channels 14, 14' which extend almost the full length of tray 11 as seen in FIG. 2.

Figure 2:
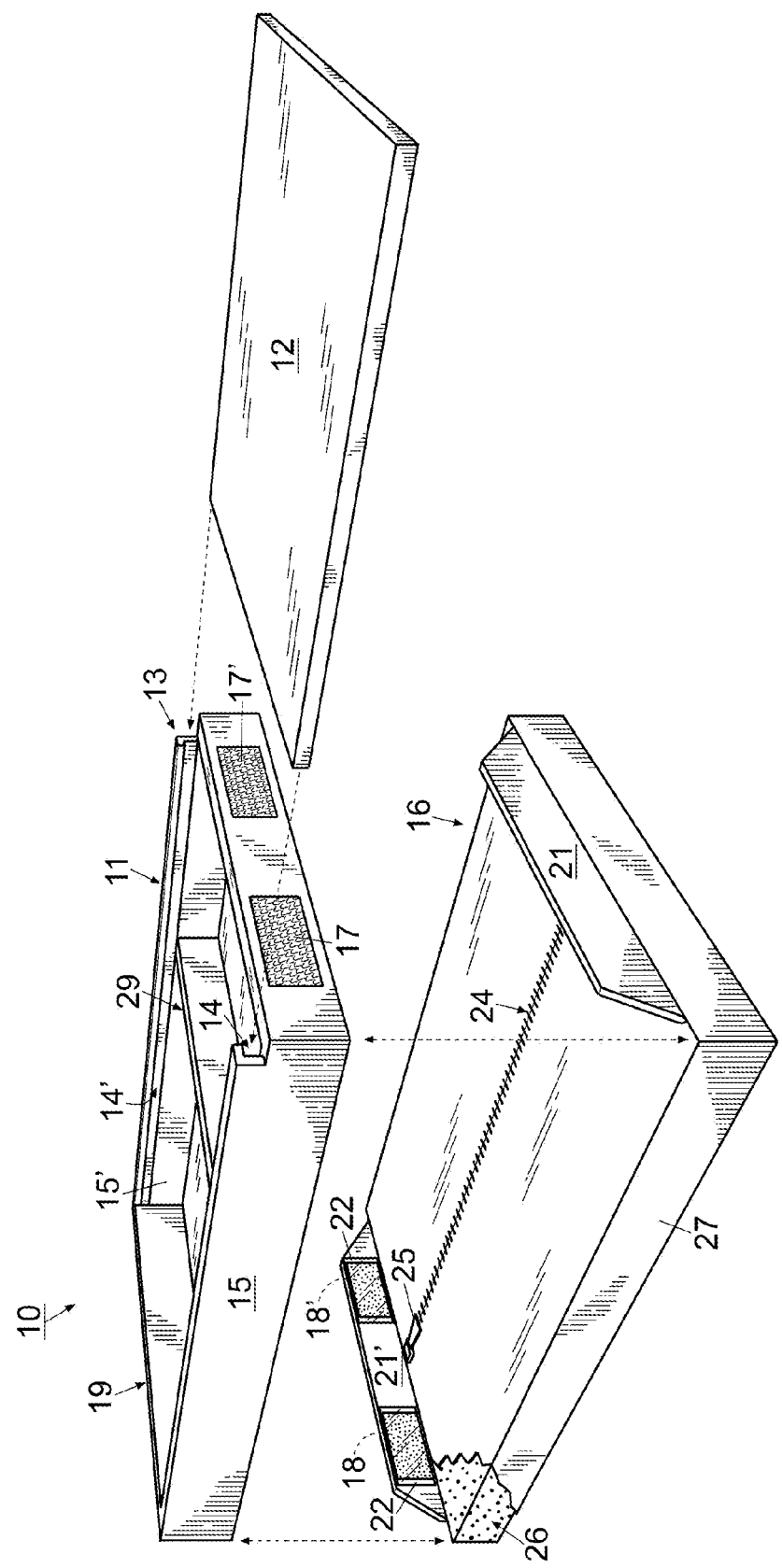
FIG. 2 demonstrates in exploded fashion the tray system of FIG. 1 with the top removed from the tray and the bottom cushion detached from the tray.
Figure 3:
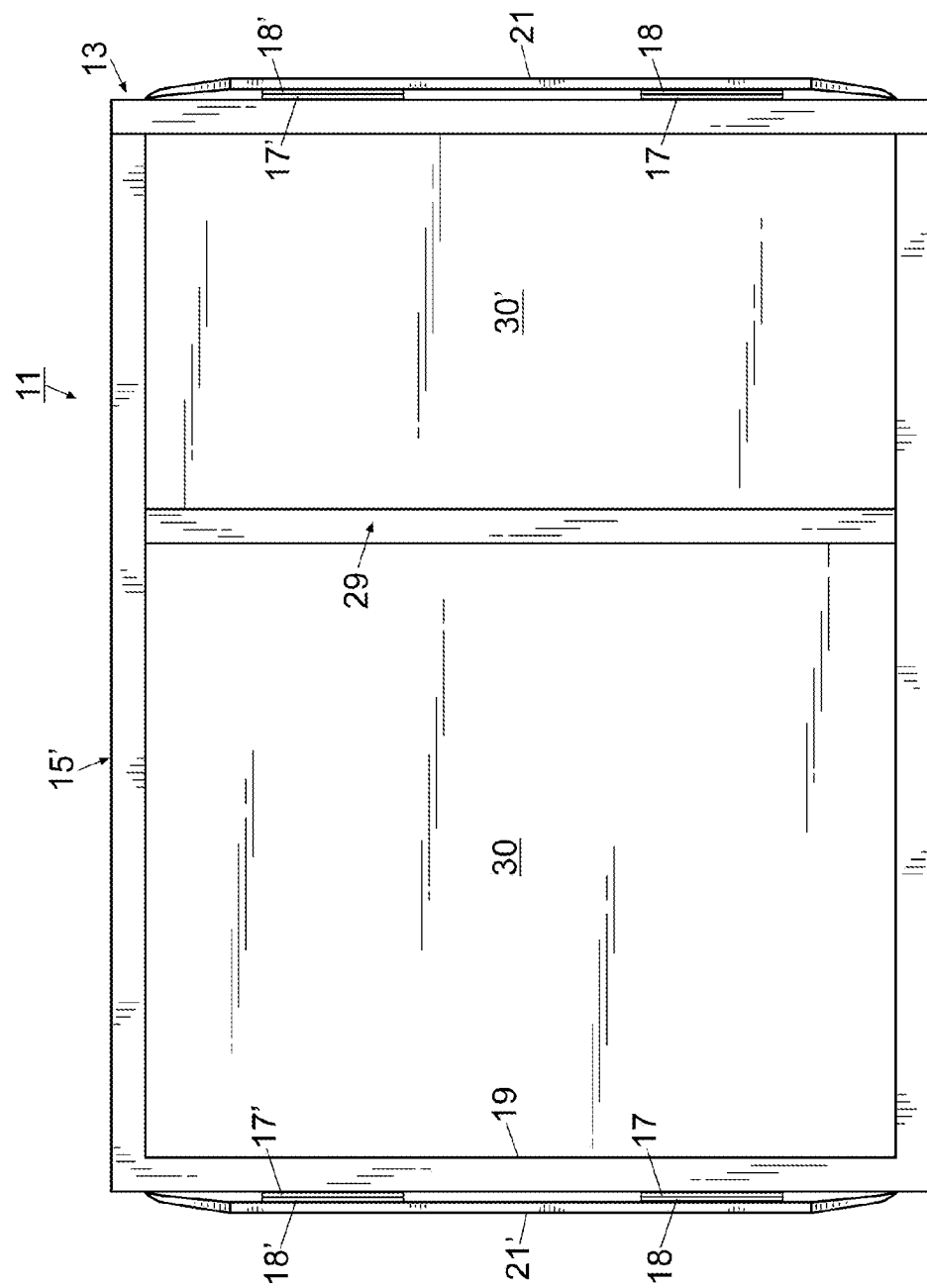
FIG. 3 illustrates a top view of the tray system with the top removed to display the divider in the tray.

Tray system 10 is shown in FIG. 2 with planar top 12 exploded from tray 11 which is detached from cushion 16. Tray 11 includes opposing pairs of hook fastener sections 17, 17' on open end 13 and closed end 19 (FIG. 3) of tray 11. Mating loop fastener sections 18, 18' are affixed to each of foldable side flaps 21, 21' of cushion 16 for attachment to respectively hook fastener sections 17, 17'. Standard transparent peel off strips 22 are placed over loop fastener sections 18, 18' as desired by the user. Cushion 16 includes a zipper track 24 for zipper pull 25 as seen in FIG. 2 for opening and closing cushion 16 such as to remove or install polyurethane foam insert 26 as seen in cutaway fashion. Cover 27 may consist of a conventional easy to clean vinyl fabric. As would be understood, hook fastener sections 17, 17' on tray 11 mate with respectively complimentary loop fastener sections 18, 18' as shown in FIG. 3 to secure cushion 16 to tray 11 as needed. When tray 11 is used on a table top or counter, side flaps 21, 21' can be disengaged from tray 11 and cushion 16 can be stored as convenient. Tray divider 29 is used to separate tray 11 into two sections or compartments 30, 30' (FIG. 3) for use in storage and retrieval of different accessories such as dry erase crayons, pegs, coins, buttons, dry erase markers or other objects (not shown).

Regarding FIGS. 1 and 2, top 12 as shown is formed from a smooth planar material with both top and bottom surfaces being smooth and even. Top 12 may be formed from the same 100% virgin polymer, marine-grade cellular material as tray 11 for durability and ease in cleaning. Planar top 12 can be used as a writing board, jigsaw puzzle table or for other purposes and is preferably finished with a dry erase coating for easy removal of marks thereon as will be described in greater detail below.

Figure 4:
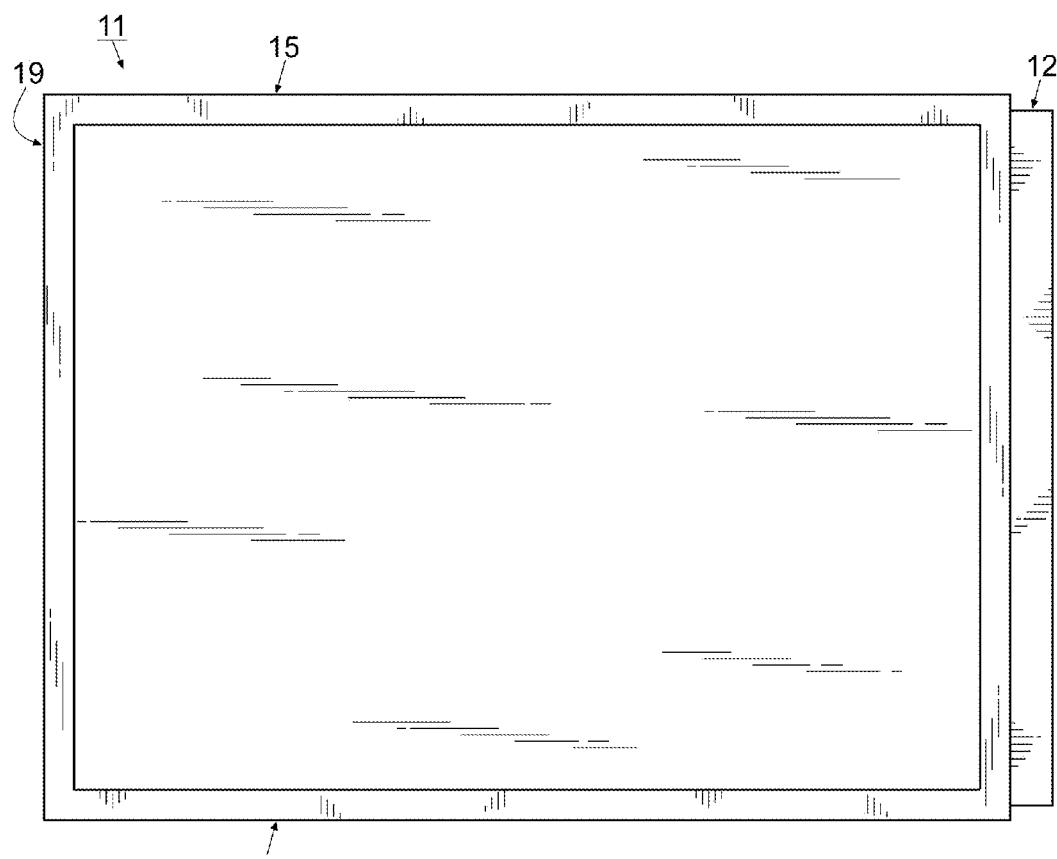
FIG. 4 pictures a bottom plan view of the tray as seen in FIG. 1 with the bottom cushion removed.
Figure 5:
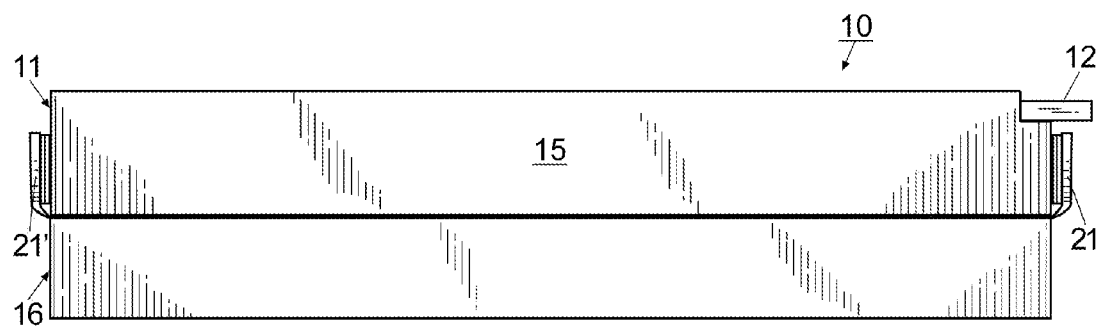
FIG. 5 features a front elevational view of the tray system as seen in FIG. 1 with the top inserted, the rear elevational view being a mirror image thereof.
Figure 6:
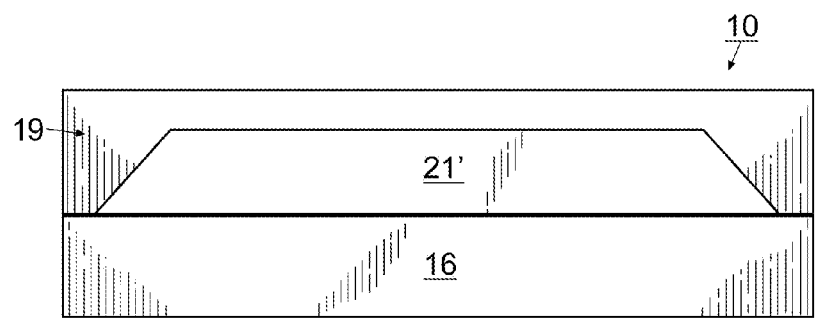
FIG. 6 depicts a left end view of the tray system as shown in FIG. 1.

In FIG. 4 the bottom of tray 11 is shown and top 12 as seen overhangs the edge for ease in grasping and removing top 12 from tray 11. Side 15 is shown in FIG. 5 and likewise demonstrates the overhang of top 12 in tray system 10 and the connection of side flaps 21, 21' to tray 11. Closed end 19 is shown in FIG. 6 with side flap 21' of cushion 16 affixed thereto. Open end 13 is shown in FIG. 7 illustrating top 12 positioned within channels 14, 14' of tray 11 and side flap 21 of cushion 16 affixed thereto.

Figure 8:
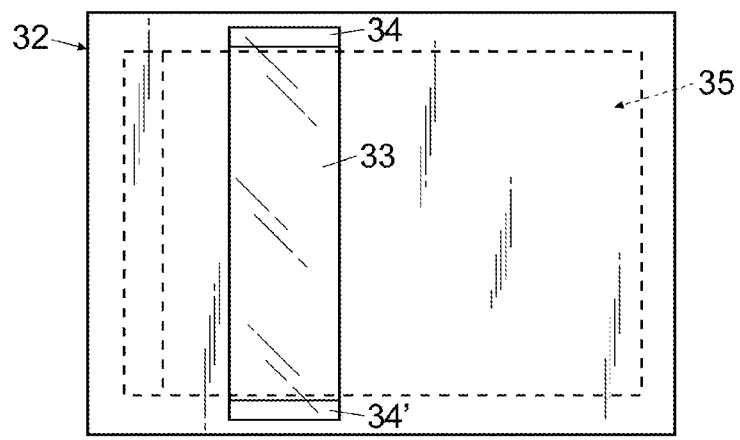

In FIG. 8 planar top 32 is shown with transparent retaining strap 33 attached thereto by ends 34, 34'. Strap 33 consists of a transparent material and is fixed to planar top 32 by ends 34, 34' by conventional means such as adhesives, hook and loop fastener sections or the like. Strap 33 is somewhat flexible to receive the back portion (not shown) of a writing tablet, sketch pad or the like and as seen in ghost fashion is used to contain writing tablet 35. Papers, books and other thin materials can be temporarily secured to top 32 by the use of transparent strap 33.

Figure 9:
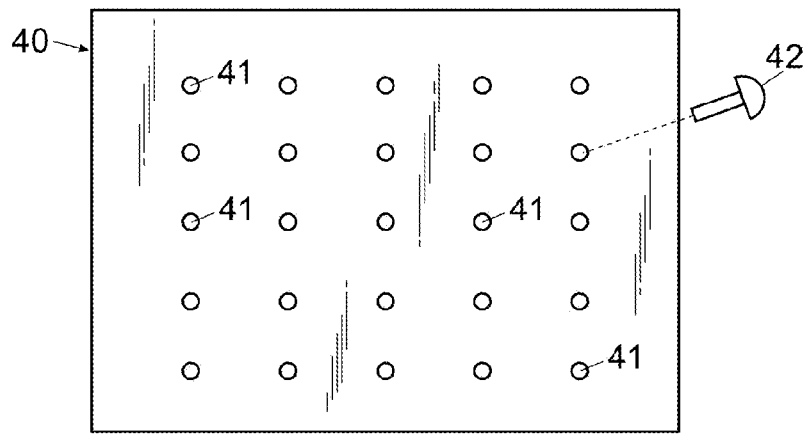
FIG. 9 demonstrates a top plan view of a top with recesses therein for use with pegs.

In FIG. 9 game peg top 40 is shown with one peg 42 exploded therefrom. A plurality of recesses 41 formed therein allow for insertion of pegs 42 which are formed from wood, plastic or other suitable materials. Various types of peg games can be played which increases the manual dexterity of users through repetition. Pegs 42 may be formed having different colors for playing a variety of peg games. For example, two sets of colored pegs 42 would be used for "Peg Knight Game" in which twelve pegs 42 of one color are placed within recesses 41 on one side and twelve pegs 42 of another color are placed within recesses 41 on the other side leaving only one recess 41 empty in the middle of top 40. The object of the game is to move the colored pegs from their starting side to the opposite side of the board moving only one peg at time.

Figure 10:
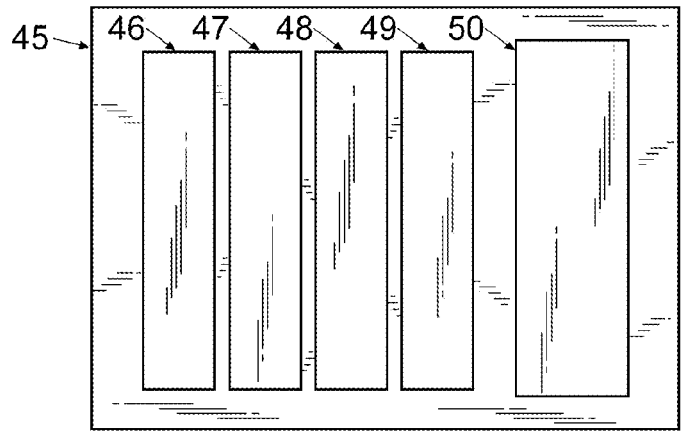
FIG. 10 illustrates a top plan view of a sorter top having depressions therein.

Top 45 is shown in FIG. 10 which includes a series of small shallow rectangular depressions 46, 47, 48, 49 and a larger shallow rectangular depression 50. Top 45 is referred to as a "sorting top" to allow placement of coins, buttons, stamps or the like. For example a multitude of various coins can be placed in larger depression 50 which can then be sorted by size in smaller depressions 46-49. Such sorting improves the manual dexterity of the user which may suffer from alzheimers or other ailments.

Figure 11:
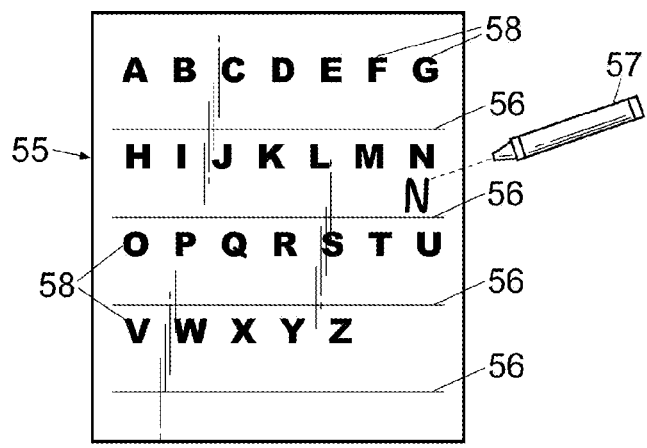
FIG. 11 features a top plan view of a top having indicia thereon for practicing writing the alphabet.

Top 55 shown in FIG. 11 includes the alphabet by uppercase letters printed thereon as seen by indicia 58. Below each line of the alphabet and spaced therefrom is a printed blank line 56 to allow the user to write each letter thereon using a dry erase marker or crayon 57. Once the alphabet writing has been completed, the user can simply wipe the markings therefrom and reuse top 55 as needed. As would be understood and although not shown top 55 could have numerous educational matter printed thereon such as the alphabet in lowercase letters, numbers ranging from 1-10, or multiples of 2, 5, 10 or the like for various mental exercises. The indicia printed thereon is preferably ink jet printing ink having colors such as magenta, yellow, black, cyan and white such as manufactured by Fujifilm Sericol UK limited.

Figure 12:
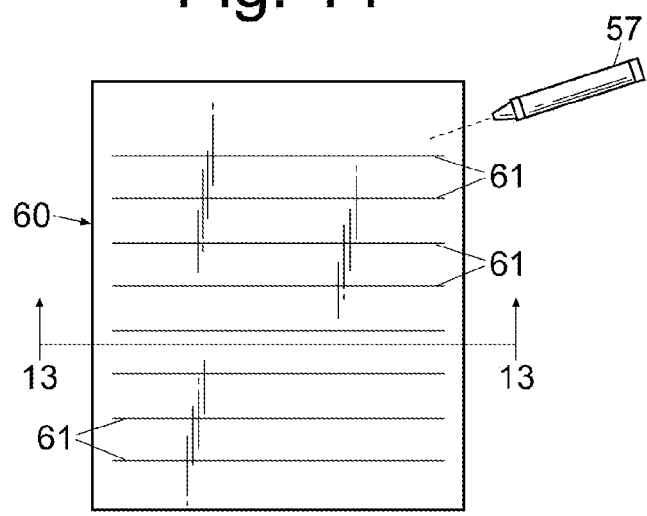
FIG. 12 depicts a top plan view of a writing top with lines.

In FIG. 12 top 60 is shown having blank lines 61 printed thereon for an easy way to practice writing such as with dry erase crayon 57. Top 60 can be easily wiped clean and reused over and over again.

Figure 14:
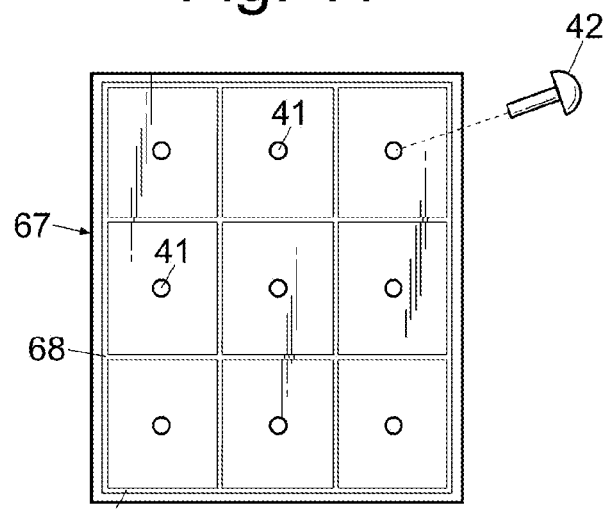
FIG. 14 demonstrates a top plan view of a tic-tac-toe tray top with an exploded peg.

In FIG. 14, top 67 is shown having grid lines 68 thereon for depicting a tic-tac-toe game. Top 67 includes recesses 41 therein for placement of pegs 42 in playing a conventional game of tic-tac-toe.

Figure 13:
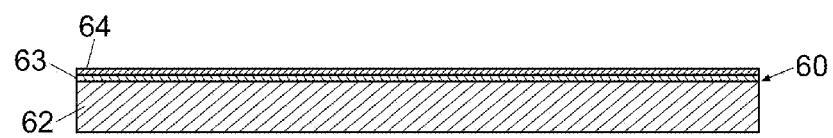
FIG. 13 pictures a cross-sectional view of the top as seen in FIG. 12 along lines 13-13.

FIG. 13 is shown as cut along lines 13-13 of FIG. 12 to illustrate the cross-sectional view of the various layers of top 60. Top 60 includes conventional polymeric layer or base 62 which has been coated with a pre-coat 63 such as "InstaCure SuperFlex Gloss" which is a UV curable liquid laminate manufactured by Drytac Corp. of 5601 Eastport Boulevard, Richmond, Va. 23231 and final coat 64 identified as "InstaCure Dry Erase" is a UV coating also manufactured by Drytac Corp. of Richmond, Va. The "InstaCure Dry Erase" coating can be utilized on a variety of substrates for use with wet or dry erase markers and can be coated on unprinted base substrates or over traditionally printed inks as shown by indicia letters 58 and blank lines 56 in FIG. 11 and blank lines 61 in FIG. 12. Coating 64 allows for ease in writing, coloring or the like and cleaning of the top surface.

As would be understood all the tops shown and described herein are formed from the same material, sized to snugly fit and slide within channels 14, 14' of tray 11, have a smooth, continuous planar bottom and are all coated with the same easy to clean, durable coating as hereinbefore described. As further understood, the tops may be sized whereby a top is shorter in length such as seen by tops 55 (FIG. 11), 67 (FIG. 14) and 60 (FIG. 12) and would snugly fit within both channels 14, 14' of tray 11, while leaving either of storage compartments 30, 30' open to allow for placement or retrieval of items, such as pegs 42 or dry erase crayons 57 therein (not shown).

As would be understood a variety of board tops could be formed having various shapes, cutouts, slots, grooves, cavities, recesses and the like for enjoyment of a variety of activities which may enhance or improve the quality of life whether working on a puzzle or craft, playing a game, or practicing some of life's most basic skills. Many users are provided with a variety of options by tray system 10 to continue physical as well as mental therapy to exercise the mind, body and senses for improving their quality of life.

Figure 15:
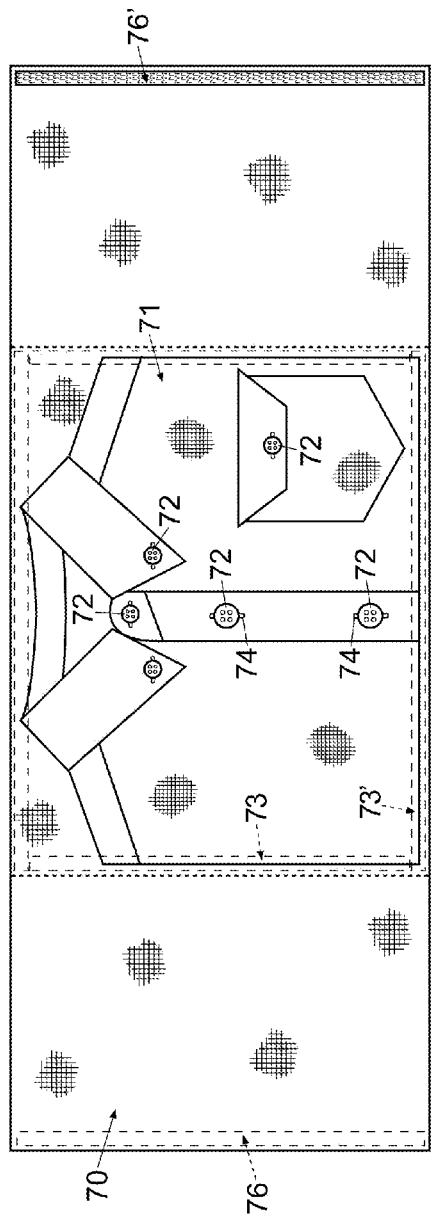
FIG. 15 shows a top plan view of shirt components affixed to a fabric layer.
Figure 16:
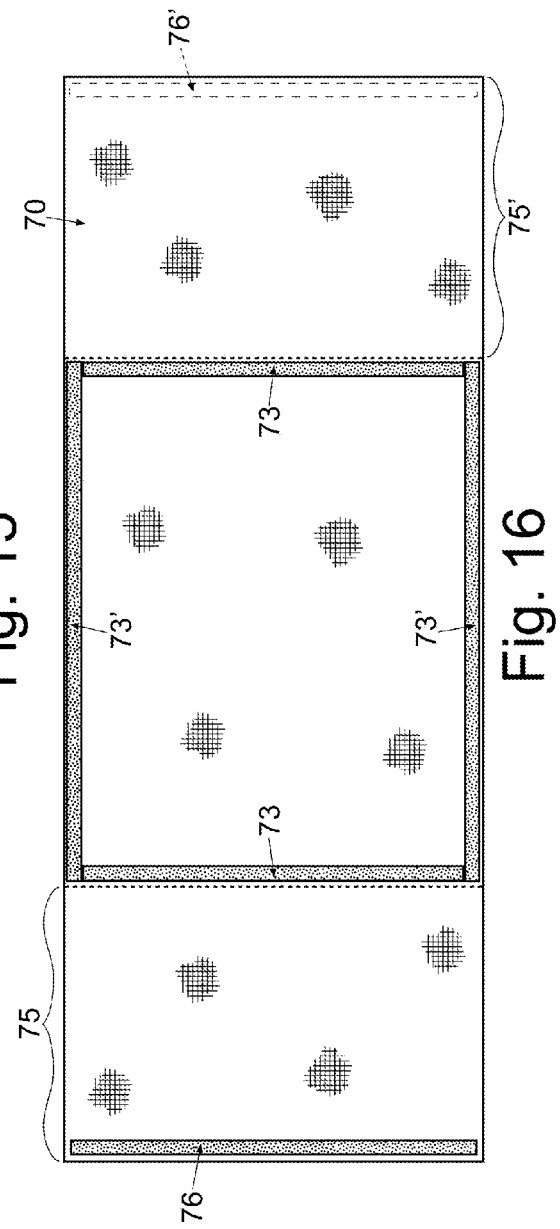
FIG. 16 illustrates a bottom plan view of the fabric layer seen in FIG. 15 having loop fastener sections.

FIGS. 15 and 17 show a planar fabric base 70 such as formed from nylon fabric or other durable materials with various fragmented components from clothing affixed thereto. Affixed to planar fabric base 70 as shown in FIG. 15 is fragmented shirt replica 71 being the front and collar portion of a shirt having a pocket thereon utilizing a series of buttons 72 for mating with corresponding button holes 74. In use, buttons 72 can be opened or closed in their respective button holes 74 to improve mental and manual abilities in performing buttoning and unbuttoning. Shirt replica 71 is affixed such as by sewing to fabric base 70 which, along the edges of the back as shown in FIG. 16 includes a series of loop fastener sections 73, 73' which are joined respectively to mating hook fastener sections 86, 86' on planar top 85 shown in FIG. 18. Once loop fastener sections 73, 73' of fabric base 70 are joined with hook fastener sections 86, 86' of top 85, side extensions 75, 75' are then folded behind top 85 and joined by loop fastener section 76 (FIG. 16) on side extension 75 to hook fastener section 76' (FIG. 15) on side extension 75' to secure fabric base 70 to top 85. Next, top 85 is slid into channels 14, 14' of tray 11 and the user (not shown) can practice buttoning and unbuttoning the different portions of shirt section 71. As would be understood shirt replica 71 could be formed with snaps (not shown) in place of buttons 72 and button holes 74 for practice in snapping and unsnapping. As seen in FIG. 18, hook fastener sections 86' on top 85 are spaced from the edge thereof to allow for easy placement of top 85 within channels 14, 14' of tray 11 without interference from fabric base 70.

An alternate fabric base 70 is shown with different garment and accessory fragments affixed thereto including shirt sleeve fragment 78 having buttons 72 and corresponding button holes 74, front portion pant fragment 79 having button 72 with corresponding button hole 74 and zipper 82 and belt fragment 80 with buckle 81. These various garment fragments likewise assist the user in practicing various skills for visual and tactile stimulation as well as mental and manual dexterity. Although not shown various other types of garments such as shoe laces, ties or the like could be formed therewith for practicing other such skills and activities. As would be understood alternate fabric base 70 in FIG. 17 likewise includes loop fastener sections 73, 73' for joining with respectively mating hook fastener sections 86, 86' and loop fastener section 76 on side extension 75 to join with hook fastener section 76' on side extension 75' to secure alternate fabric base 70 to top 85 as hereinbefore described. Although the hook and loop fastener sections are specified herein and shown on particular parts in the drawings as would be understood their arrangement could be alternated or sized differently during manufacturing.

Tray system 10 is used in a method of practicing physical and mental skills which includes the steps of first selecting tray 11 with or without cushion 16. Cushion 16 if desired can be releasably attached to tray 11 by attaching loop fastener sections 18, 18' of flaps 21, 21' to respectively hook fastener sections 17, 17' of tray 11. Next tray 11 with cushion 16 attached is placed on the user's lap, a table (not shown) or other suitable location. Next a game or activity is chosen and an appropriate top is selected, such as one of tops 12, 32, 40, 45, 55, 60, 67, or top 85 with either fabric base 70 (FIGS. 15, 17) attached thereto or otherwise. The selected top is then inserted in tray 11. The appropriate accessories such as dry erase crayons 57, writing tablet 35, pegs 42 or otherwise are then retrieved from either of compartments 30, 30' for use with the selected top.

Once the selected game or activity is completed, tray system 10 is then returned to its storage area such as a drawer, closet or presented to another user for activity purposes. More than a single top can be selected by a user for sequential game and activities depending on the user's desires and capabilities.

The illustrations and examples provided herein are for explanatory purposes and are not intended to limit the scope of the appended claims.

I claim:

1. A tray assembly comprising a cushion attached to a tray, the tray defining a bottom, a pair of sides and a pair of ends, the pair of sides and the pair of ends attached to the bottom, each of the sides defining opposing open and closed ends, the sides each defining a channel, a plurality of exchangeable tops configured to receive writing thereon, each of the tops slidably contained within the channels, at least one of the tops extending beyond the open end from one of the sides to the other side when fully inserted in the channels, a divider attached between the pair of sides, a first flap, a second flap, the first and second flaps hingedly affixed to the cushion in opposing relation, a means to attach the first and second flaps to the tray comprising a hook section, a loop section and a release layer, the hook section engaging the loop section and the release layer joined to the loop section, whereby the tray is releaseably positioned on the cushion between the first and second flaps and engaging the attaching means.

2. The tray of claim 1 whereby at least one of the tops comprises a dry erase surface.

3. The tray of claim 1 whereby at least one of the tops comprises alphanumeric indicia.

4. The tray of claim 3 whereby the alphanumeric indicia comprises a plurality of letters.

5. The tray of claim 1 whereby at least one of the tops comprises a plurality of parallel lines.

6. The tray of claim 1 whereby at least one of the tops comprises a plurality of parallel lines and a plurality of letters positioned proximate at least one of the plurality of parallel lines.

7. A rectangular tray assembly comprising a cushion attached to a tray defining a bottom, a pair of sides, a pair of ends, the pair of sides and the pair of ends attached to the bottom, each of the sides defining opposing open and closed ends, the pair of sides each defining a channel, each of the sides longer than the channels, an exchangeable top configured to receive writing thereon, the top defining a planar member formed from dry erase material with indicia thereon, the top slideably mounted in the channels and longer than each of the sides, the top extending beyond the open end from one of the sides to the other side when fully inserted in the channels, a divider extending across the bottom and attached laterally to the pair of sides below the top defining a pair of compartments, a cushion, the bottom of the tray positioned on the cushion, a zipper track, a zipper pull, the zipper track and the zipper pull engaging one another and positioned on the cushion, a first flap, a second flap, the first and second flaps hingedly attached to the cushion in opposing relation, a pair of means to attach the first and second flaps to the tray, the attaching means comprising a pair of hook sections, a pair of loop sections, and a pair of release layers, the hook sections engaging the loop sections and the release layers joined to the loop sections.

8. The tray assembly of claim 7 whereby the indicia comprises alphanumeric indicia.

9. The tray assembly of claim 8 whereby the alphanumeric indicia comprises a plurality of letters.

10. The tray assembly of claim 7 whereby the indicia comprises a plurality of parallel lines.

11. A method of practicing communication skills comprising the steps of:
    a) providing a tray assembly with sides defining a closed end and an opposing open end for receiving a plurality of exchangeable tops configured to receive writing thereon which slide into channels along the tray sides and are releaseably positioned atop a cushion;
    b) selecting a top for a specific skill for sliding in the side channels;
    c) inserting the selected top into the side channels via the open end; such that the selected top extends beyond the open end from one of the sides to the other side when fully inserted in the channels
    d) manually practicing the skill commensurate with the selected top; and
    e) releaseably positioning the tray assembly atop the cushion by providing a first flap, a second flap, said first and second flaps hingedly attached to the cushion in opposing relation, a means to attach the first and second flaps to the tray assembly comprising a hook section, a loop section and a release layer, the hook section engaging the loop section and the release layer joined to the loop section.

12. The method of claim 11 whereby selecting a top comprises the steps of:
    a) selecting a top formed from a dry erase material and comprising indicia; and
    b) writing on the top.

13. The method of claim 12 whereby selecting a top comprising indicia further comprises the step of selecting a top comprising a plurality of parallel lines.

14. The tray assembly of claim 12 whereby one of said exchangeable tops defines a plurality of parallel lines and a plurality of letters positioned proximate at least one of the plurality of parallel lines.

* * * * *